US012658790B2

(12) United States Patent
Cheng et al.

(10) Patent No.: US 12,658,790 B2
(45) Date of Patent: Jun. 16, 2026

(54) CONTROL METHOD OF POWER FACTOR CORRECTION CIRCUIT

(71) Applicant: Delta Electronics, Inc., Taoyuan City (TW)

(72) Inventors: Wei-Cheng Cheng, Taoyuan City (TW); Yen-Ting Chen, Taoyuan City (TW); Ching-Jung Lin, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 319 days.

(21) Appl. No.: 18/540,189

(22) Filed: Dec. 14, 2023

(65) Prior Publication Data

US 2024/0223075 A1    Jul. 4, 2024

Related U.S. Application Data

(60) Provisional application No. 63/436,203, filed on Dec. 30, 2022.

(30) Foreign Application Priority Data

Oct. 27, 2023    (CN) .......................... 202311407238.1

(51) Int. Cl.
*H02M 1/42* (2007.01)
(52) U.S. Cl.
CPC ................................. *H02M 1/4233* (2013.01)
(58) Field of Classification Search
CPC .... H02M 1/4233; H02M 1/42; H02M 1/4225; H02M 1/4241; H02M 1/425; H02M 1/4291; H02M 1/44
See application file for complete search history.

(56) References Cited

U.S. PATENT DOCUMENTS

D217,915 S    6/1970   Brenner
D419,533 S    1/2000   Smith
            (Continued)

FOREIGN PATENT DOCUMENTS

CN    100585841 C    1/2010
CN    102342193 A    2/2012
            (Continued)

OTHER PUBLICATIONS

Xu Yu-Zhen et al: "Inductor optimize design for BCM BUCK-PFC in LED driver", IEEE, Apr. 15, 2011, pp. 2264-2267.
            (Continued)

*Primary Examiner* — Nguyen Tran
(74) *Attorney, Agent, or Firm* — KIRTON McCONKIE; Evan R. Witt

(57) ABSTRACT

A control method of a power factor correction circuit is provided. The first operating frequency of the power factor correction circuit is controlled to less than one-third of the minimum limitation frequency, the first operating frequency is controlled to less than 1–Nth of the first suppression frequency, and the second operating frequency of the power factor correction circuit is controlled to less than 1–Nth of the second suppression frequency. Consequently, at least portion of the operating frequency of the power factor correction circuit is not in the range measured by the machine so as to reduce the value of the noise of the electromagnetic interference.

9 Claims, 5 Drawing Sheets

(56)     References Cited

U.S. PATENT DOCUMENTS

| | | | |
|---|---|---|---|
| D467,227 | S | 12/2002 | Lee |
| D504,399 | S | 4/2005 | Peled et al. |
| D649,933 | S | 12/2011 | Wang et al. |
| D675,160 | S | 1/2013 | Tanaka et al. |
| D786,793 | S | 5/2017 | Lin et al. |
| D795,244 | S | 8/2017 | Zimmermann |
| 9,762,037 | B1 | 9/2017 | Lach |
| D813,163 | S | 3/2018 | Stravets et al. |
| D839,826 | S | 2/2019 | Dong et al. |
| D865,671 | S | 11/2019 | Dong et al. |
| D877,074 | S | 3/2020 | Stravets et al. |
| 10,624,223 | B1 | 4/2020 | Tsorng et al. |
| D886,752 | S | 6/2020 | Xiang |
| 10,951,013 | B2 | 3/2021 | Huang |
| D928,081 | S | 8/2021 | Hwang et al. |
| 2004/0184292 | A1 | 9/2004 | Knox |
| 2008/0019154 | A1* | 1/2008 | Lanni ................... H02M 7/217 |
| | | | 323/215 |
| 2009/0230929 | A1* | 9/2009 | Sui ...................... H02M 1/4208 |
| | | | 323/207 |
| 2011/0315355 | A1 | 12/2011 | Campbell et al. |
| 2014/0126129 | A1 | 5/2014 | Kyle |
| 2014/0216714 | A1 | 8/2014 | Dittmer et al. |
| 2016/0190914 | A1* | 6/2016 | Kim .................... H02M 1/0085 |
| | | | 363/126 |
| 2018/0092243 | A1 | 3/2018 | Saito |
| 2018/0338386 | A1 | 11/2018 | Chen et al. |
| 2019/0045661 | A1 | 2/2019 | Broderick et al. |
| 2019/0281727 | A1 | 9/2019 | Fujiwara et al. |
| 2020/0029464 | A1 | 1/2020 | Inano |
| 2020/0281093 | A1 | 9/2020 | Korikawa |
| 2022/0217845 | A1 | 7/2022 | Salmon |
| 2022/0248564 | A1 | 8/2022 | Moon |
| 2022/0312625 | A1 | 9/2022 | Antaran et al. |
| 2023/0042343 | A1 | 2/2023 | Hashimoto |
| 2023/0059446 | A1 | 2/2023 | Gao |
| 2023/0189457 | A1 | 6/2023 | Tsorng et al. |
| 2023/0217626 | A1 | 7/2023 | Keehn et al. |
| 2024/0224459 | A1 | 7/2024 | Shen et al. |

FOREIGN PATENT DOCUMENTS

| | | |
|---|---|---|
| CN | 106879222 A | 6/2017 |
| CN | 207519013 U | 6/2018 |
| CN | 305041627 S | 2/2019 |
| CN | 109874275 A | 6/2019 |
| CN | 109510445 B | 2/2020 |
| CN | 210073558 U | 2/2020 |
| CN | 111864305 A | 10/2020 |
| CN | 110535338 B | 11/2020 |
| CN | 112469242 A | 3/2021 |
| CN | 113015417 A | 6/2021 |
| CN | 213492911 U | 6/2021 |
| CN | 213694613 U | 7/2021 |
| CN | 110505783 B | 11/2021 |
| CN | 306956066 S | 11/2021 |
| CN | 114389569 A | 4/2022 |
| CN | 307407783 S | 6/2022 |
| CN | 307423649 S | 6/2022 |
| CN | 115016611 A | 9/2022 |
| CN | 115248623 A | 10/2022 |
| CN | 218163398 U | 12/2022 |
| CN | 115712327 A | 2/2023 |
| CN | 308668853 S | 6/2024 |
| EM | 015021152 | 5/2023 |
| EP | 2465189 B1 | 6/2019 |
| EP | 3530896 B1 | 2/2020 |
| IN | 386018-001 | 11/2023 |
| JP | H07202377 A | 8/1995 |
| JP | 2010103282 A | 5/2010 |
| KR | 20160047575 A | 5/2016 |
| TW | 200836615 A | 9/2008 |
| TW | 201115102 A | 5/2011 |
| TW | 201240301 A | 10/2012 |
| TW | 201828798 A | 8/2018 |
| TW | 201843917 A | 12/2018 |
| TW | D195786 S | 2/2019 |
| TW | 202102101 A | 1/2021 |
| TW | D229808 S | 2/2024 |
| WO | 2015149317 A1 | 10/2015 |
| WO | 2016153459 A1 | 9/2016 |
| WO | 2022149525 A1 | 7/2022 |
| WO | 2023129225 A1 | 7/2023 |

OTHER PUBLICATIONS

Nielsen Alex Buus et al., Power Density and Loss Optimization Design Methodology of a 10 KW 2-Level 3-Phase Sic Inverter, IEEE, Nov. 9, 2020.

Chen Jianan et al, A Family of Spread-Spectrum Modulation Schemes Based on Distribution Characteristics to Reduce Conducted EMI for Power Electronics Converters, IEEE, Jun. 15, 2020, pp. 5142-5157.

* cited by examiner

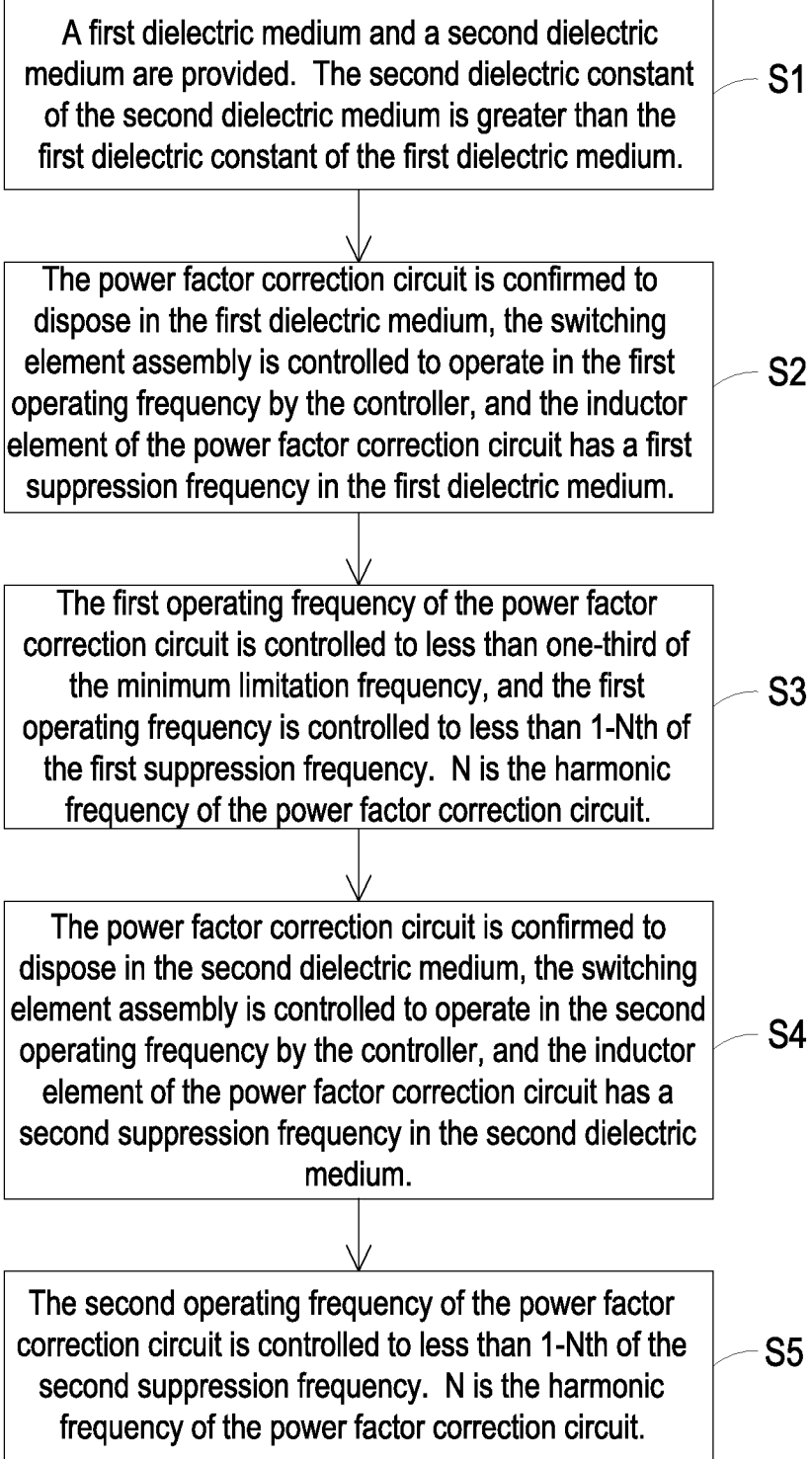

A first dielectric medium and a second dielectric medium are provided. The second dielectric constant of the second dielectric medium is greater than the first dielectric constant of the first dielectric medium. — S1

The power factor correction circuit is confirmed to dispose in the first dielectric medium, the switching element assembly is controlled to operate in the first operating frequency by the controller, and the inductor element of the power factor correction circuit has a first suppression frequency in the first dielectric medium. — S2

The first operating frequency of the power factor correction circuit is controlled to less than one-third of the minimum limitation frequency, and the first operating frequency is controlled to less than 1-Nth of the first suppression frequency. N is the harmonic frequency of the power factor correction circuit. — S3

The power factor correction circuit is confirmed to dispose in the second dielectric medium, the switching element assembly is controlled to operate in the second operating frequency by the controller, and the inductor element of the power factor correction circuit has a second suppression frequency in the second dielectric medium. — S4

The second operating frequency of the power factor correction circuit is controlled to less than 1-Nth of the second suppression frequency. N is the harmonic frequency of the power factor correction circuit. — S5

FIG. 4

CONTROL METHOD OF POWER FACTOR CORRECTION CIRCUIT

CROSS-REFERENCE TO RELATED APPLICATION

This application claims the benefit of U.S. Provisional Application No. 63/436,203 filed on Dec. 30, 2022 and entitled "IMMERSION POWER SHELF". This application claims priority to China Patent Application No. 202311407238.1 filed on Oct. 27, 2023 and entitled "CONTROL METHOD OF POWER FACTOR CORRECTION CIRCUIT", the entire contents of which are incorporated herein by reference for all purposes.

FIELD OF THE INVENTION

The present disclosure relates to a control method of a power factor correction circuit, and more particularly to a control method of a power factor correction circuit for controlling an operating frequency.

BACKGROUND OF THE INVENTION

Normally, the power rack is immersed in the cooling liquid for heat dissipating. It is noted that the resonance frequency point of the inductor (including the common mode inductor and the differential mode inductor) of the power factor correction circuit disposed within the power rack is attenuated by the cooling liquid. For example, when the power rack utilizes air cooling for heat dissipating, the resonance frequency point of the inductor is 413 kHz. Namely, the electromagnetic interference noise suppressed by the inductor is ranged between 0 to 413 kHz. Otherwise, when the power rack utilizes cooling liquid for heat dissipating, the resonance frequency point of the inductor is 333 kHz. Namely, the electromagnetic interference noise suppressed by the inductor is ranged between 0 to 333 kHz. The ability of the electromagnetic interference noise suppressed by the inductor is reduced when the power rack is immersed in the cooling liquid. Since the electromagnetic interference noise of the power factor correction circuit specified in the requirements for the electromagnetic interference measurement is ranged between 150 kHz and 30 MHz, it is necessary to measure the electromagnetic interference noise ranged between 333 kHz and 413 kHz separately. Consequently, the measurement value of the electromagnetic interference noise is increased.

Therefore, there is a need of providing a control method of a power factor correction circuit to obviate the drawbacks encountered from the prior arts.

SUMMARY OF THE INVENTION

The present disclosure provides a control method of a power factor correction circuit. The first operating frequency of the power factor correction circuit is controlled to less than one-third of the minimum limitation frequency, the first operating frequency is controlled to less than 1–Nth of the first suppression frequency, and the second operating frequency of the power factor correction circuit is controlled to less than 1–Nth of the second suppression frequency. Consequently, at least portion of the operating frequency of the power factor correction circuit is not in the range measured by the machine so as to reduce the value of the noise of the electromagnetic interference.

In accordance with an aspect of the present disclosure, a control method of a power factor correction circuit is provided. The power factor correction circuit complies with a minimum limitation frequency specified in an electromagnetic interference standard. The control method comprising following steps. Firstly, a first dielectric medium and a second dielectric medium are provided. A second dielectric constant of the second dielectric medium is greater than a first dielectric constant of the first dielectric medium. Then, when the power factor correction circuit is disposed in the first dielectric medium, a switching element assembly is controlled to operate in a first operating frequency by a controller. An inductor element of the power factor correction circuit has a first suppression frequency in the first dielectric medium. Then, the first operating frequency of the power factor correction circuit is controlled to less than one-third of the minimum limitation frequency. The first operating frequency is controlled to less than 1–Nth of the first suppression frequency. N is a harmonic frequency of the power factor correction circuit. Then, when the power factor correction circuit is disposed in the second dielectric medium, the switching element assembly is controlled to operate in the second operating frequency by the controller. The inductor element of the power factor correction circuit has a second suppression frequency in the second dielectric medium. Then, the second operating frequency of the power factor correction circuit is controlled to less than 1–Nth of the second suppression frequency. N is the harmonic frequency of the power factor correction circuit.

The above contents of the present disclosure will become more readily apparent to those ordinarily skilled in the art after reviewing the following detailed description and accompanying drawings, in which:

BRIEF DESCRIPTION OF THE DRAWINGS

FIG. 4 is a flowchart illustrating a control method of the power factor correction circuit of FIG. 1 disposed within the power rack.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
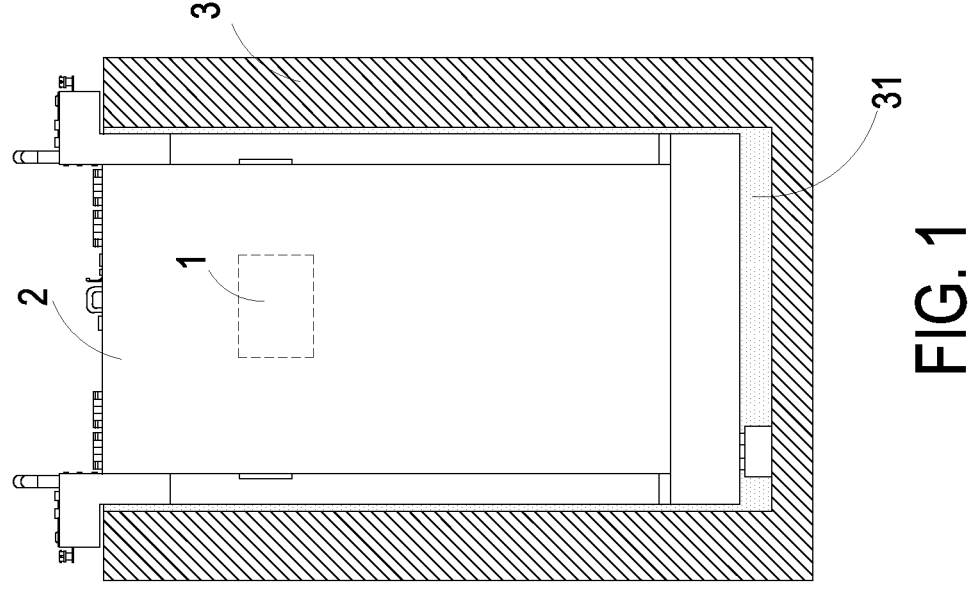
FIG. 1 is a schematic view illustrating a power rack including a power factor correction circuit of the present disclosure.
Figure 2A:
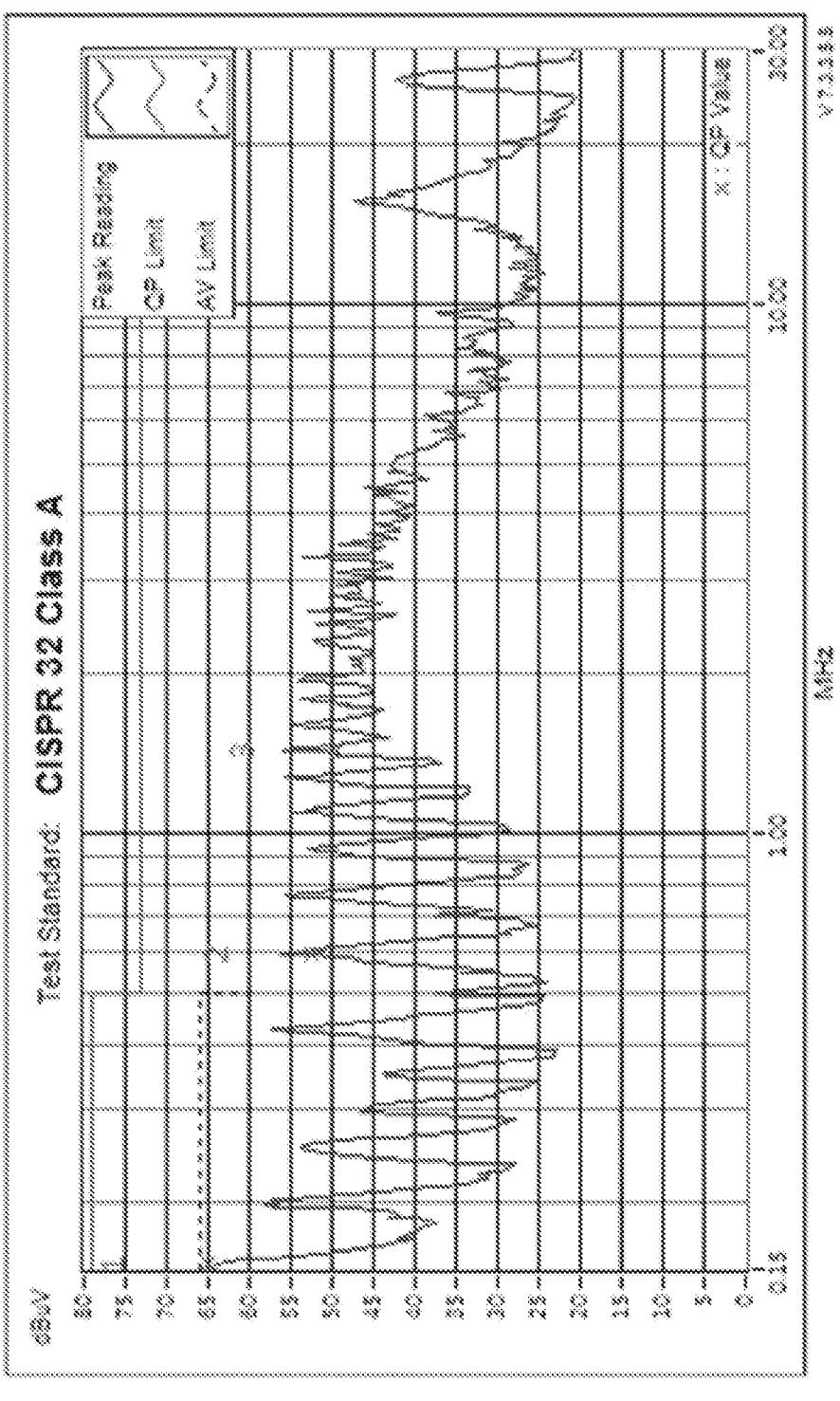
FIG. 2A is a schematic frequency waveform diagram illustrating the conventional power factor correction circuit during the operation.
Figure 2B:
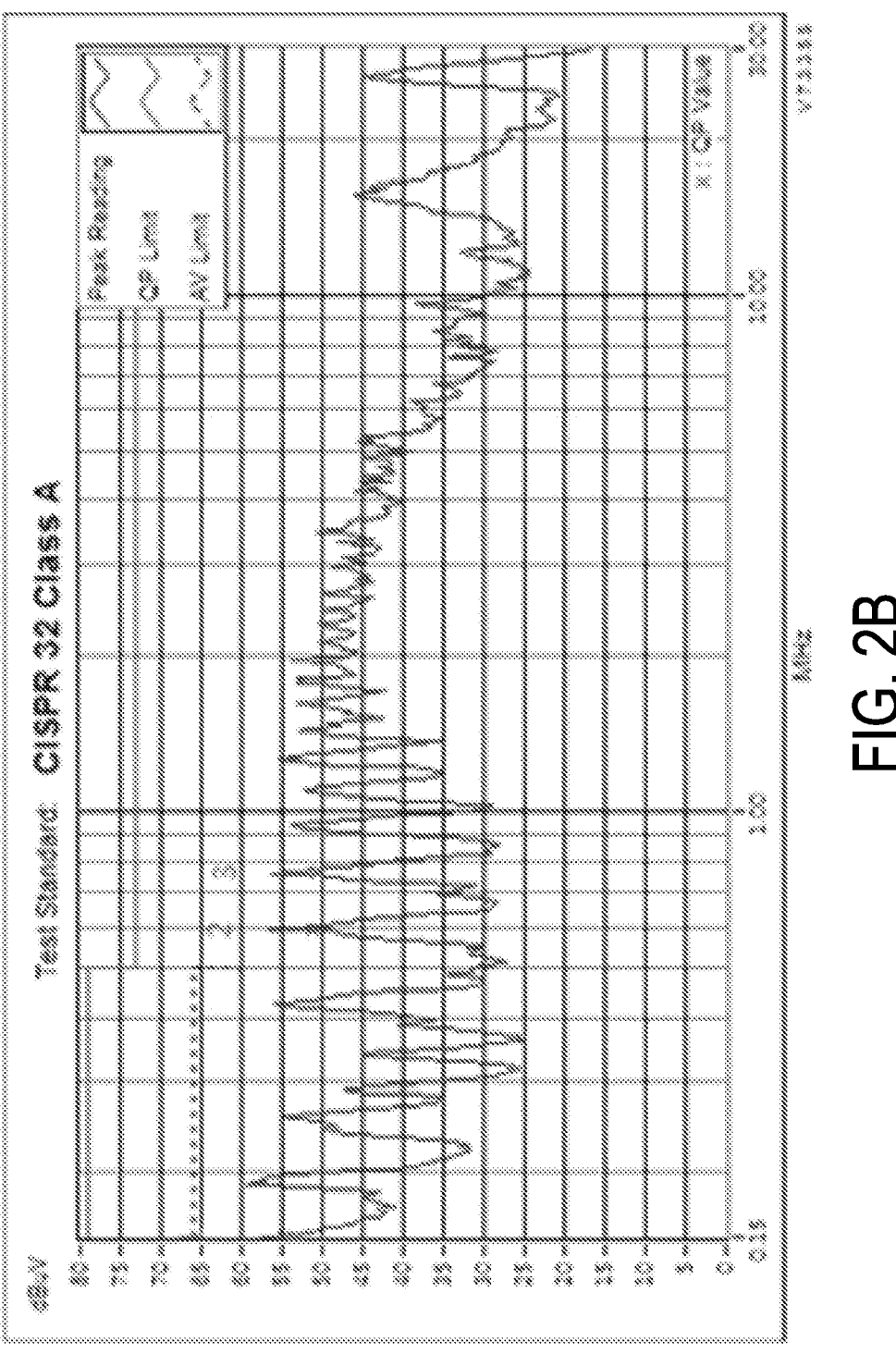
FIG. 2B is a schematic frequency waveform diagram illustrating the power factor correction circuit of FIG. 1 during the operation.
Figure 3:
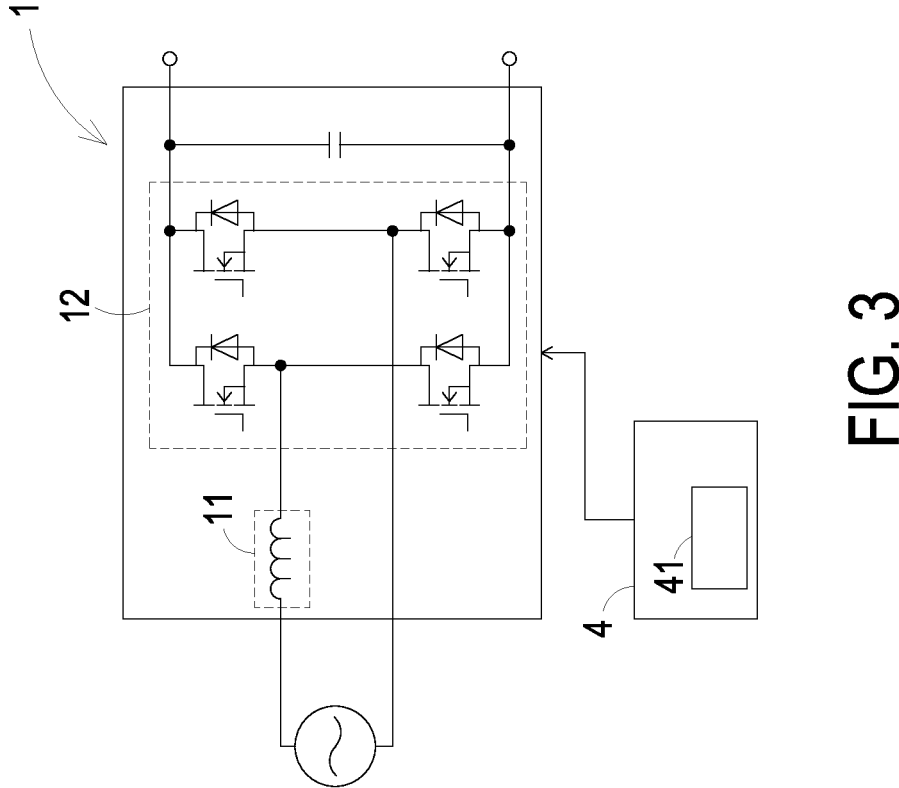
FIG. 3 is a schematic circuit diagram illustrating the power factor correction circuit of FIG. 1 disposed within the power rack.

FIG. 1 is a schematic view illustrating a power rack including a power factor correction circuit of the present disclosure. FIG. 2A is a schematic frequency waveform diagram illustrating the conventional power factor correction circuit during the operation. FIG. 2B is a schematic frequency waveform diagram illustrating the power factor correction circuit of FIG. 1 during the operation. FIG. 3 is a schematic circuit diagram illustrating the power factor correction circuit of FIG. 1 disposed within the power rack. FIG. 4 is a flowchart illustrating a control method of the power factor correction circuit of FIG. 1 disposed within the power rack. As shown in FIGS. 1 to 4, the power rack 2 is immersion type and includes a power factor correction circuit 1. The power factor correction circuit 1 includes an inductor element 11, a switching element assembly 12 and a controller 4. The power rack 2 of the present disclosure is disposed within a corresponding cooling slot 3 of a server rack. The server rack utilizes a cooling liquid 31 of the cooling slot 3 to dissipate the heat of the power rack 2 so as to urge the inductor element 11 of the power factor correction circuit 1 disposed in the power rack 2 to generate the impedance attenuation. Consequently, the performance of the electromagnetic interference (EMI) of the power factor correction circuit 1 is varied. The power rack 2 of the present disclosure utilizes the controller 4 to adjust the operating frequency of the switching element assembly 12 during the operation of the power factor correction circuit 1 so as to reduce the noise when measuring the electromagnetic interference of the power factor correction circuit 1. The detail of the control method for adjusting the operating frequency of the switching element assembly 12 during the operation of the power factor correction circuit 1 is described below.

Please refers to FIGS. 1 to 4. The electromagnetic interference measured by the current machine is ranged between 150 kHz and 30 MHz. Namely, the minimum display frequency is 150 kHz, and the maximum display frequency is 30 MHz. Moreover, the value of the noise of the electromagnetic interference of the power factor correction circuit 1 operated in the operating frequency is maximum. As shown in FIGS. 2A and 2B, the value of the signal labelled as 1 is maximum. The value of the noise of the electromagnetic interference of the power factor correction circuit 1 operated in twice of the operating frequency is secondary. As shown in FIGS. 2A and 2B, the value of the signal labelled as 2 is secondary. The value of the noise of the electromagnetic interference of the power factor correction circuit 1 operated in three-times of the operating frequency is third highest. As shown in FIGS. 2A and 2B, the value of the signal labelled as 3 is third highest. The value of the noise of the electromagnetic interference of the power factor correction circuit 1 operated in four-times of the operating frequency is less than the value of the noises of the electromagnetic interference of the power factor correction circuit 1 operated in the operating frequency, twice of the operating frequency and three-times of the operating frequency. Consequently, the noise of the electromagnetic interference of the power factor correction circuit 1 operated in four-times (or above four-times) of the operating frequency is omitted. Namely, the noise of the electromagnetic interference which is measured only includes the noises of the electromagnetic interference of the power factor correction circuit 1 operated in the operating frequency, twice of the operating frequency and three-times of the operating frequency. For reducing the noise of the electromagnetic interference which is measured, the controller 4 of the present disclosure controls the operating frequency of the power factor correction circuit 1 to reduce the noise of the electromagnetic interference. Namely, the noise of the electromagnetic interference of the power factor correction circuit 1 operated in three-times of the operating frequency is less than the minimum display frequency of the machine measuring the electromagnetic interference. For example, as shown in FIG. 2A, the original operating frequency of the power factor correction circuit disposed within the conventional power rack is 50 kHz. When the power factor correction circuit operates in three-times of the original operating frequency (i.e., 0.15 MHz=150 kHz), the noise of the electromagnetic interference is ranged between 150 kHz and 30 MHz. Consequently, the machine can measure the noise of the electromagnetic interference of the power factor correction circuit operated in three-times of the original operating frequency, and the noise of the electromagnetic interference of the power factor correction circuit which is measured is enhanced. For example, the value of the noise of the electromagnetic interference of the power factor correction circuit which is measured is –5.78 dB.

In the control method of the present disclosure, the operating frequency of the power factor correction circuit 1 is less than one-third of the minimum display frequency. For example, the operating frequency of the power factor correction circuit 1 is less than 50 kHz (i.e., 150 KHz/3). As shown in FIG. 2B, the operating frequency of the power factor correction circuit 1 is 48 KHz. The noise of the electromagnetic interference of the power factor correction circuit 1 operated in three-times of the operating frequency is not in the measuring range. Namely, the noise of the electromagnetic interference of the power factor correction circuit 1 operated in three-times of the operating frequency is not ranged between 150 kHz and 30 MHz. Consequently, the machine cannot measure the noise of the electromagnetic interference of the power factor correction circuit 1 operated in three-times of the original operating frequency, and the noise of the electromagnetic interference of the power factor correction circuit 1 which is measured is reduced. For example, the noise of the electromagnetic interference of the power factor correction circuit 1 which is measured is –17.05 dB.

In an embodiment, the power factor correction circuit 1 is controlled to operate in corresponding operating frequency under different duty cycle. When the power factor correction circuit 1 only operates at a single operating frequency, the waveform peaks of the electromagnetic interference is concentrated at a single test frequency, so that the waveform peaks of the electromagnetic interference at the single test frequency is enhanced. For reducing the waveform peaks of the electromagnetic interference at the single test frequency, the power factor correction circuit 1 of the present disclosure is controlled to operate in corresponding operating frequency under different duty cycle so as to disperse the waveform peaks of the electromagnetic interference. For example, the original operating frequency of the power factor correction circuit is 80 kHz under any duty cycle, the waveform peaks of the electromagnetic interference noise are at the single test frequency so as to enhance the electromagnetic interference noise which is measured. In this embodiment, the power factor correction circuit 1 is controlled to operate in corresponding operating frequency under different duty cycle. For example, the duty cycle of the power factor correction circuit 1 includes a first duty cycle, a second duty cycle and a third duty cycle. The power factor correction circuit 1 operates cyclically according to the first duty cycle, second duty cycle and third duty cycle. The controller 4 controls the operating frequency of the power factor correction circuit 1 being (80+X) kHz during the first duty cycle. The controller 4 controls the operating frequency of the power factor correction circuit 1 being 80 kHz during the second duty cycle. The controller 4 controls the operating frequency of the power factor correction circuit 1 being (80–X) kHz during the third duty cycle. Consequently, the waveform peaks of the electromagnetic interference noise are located at three different test frequencies dispersedly. The energy of the electromagnetic interference noise is dispersed, and the noise of the electromagnetic interference of each test frequency is reduced.

In the above embodiment, firstly, a step M1 is performed. In the step M1, the power factor correction circuit 1 is provided. The power factor correction circuit 1 includes an operating frequency and a duty cycle. The duty cycle is divided to a first duty cycle, a second duty cycle and a third duty cycle. The power factor correction circuit 1 operates cyclically according to the first duty cycle, second duty cycle and third duty cycle. Then, a step M2 is performed. In the step M2, the operating frequency of the power factor correction circuit 1 is controlled to be (80+X) kHz during the first duty cycle, the operating frequency of the power factor correction circuit 1 is controlled to be 80 kHz during the second duty cycle, the operating frequency of the power factor correction circuit 1 is controlled to be (80−X) kHz during the third duty cycle, and Y is greater than X. In this embodiment, preferably but not exclusively, Y is 80.

Please refers to FIGS. 1 to 4. The power factor correction circuit 1 is disposed in the power rack 2. The power rack 2 is disposed in the air or the cooling slot 3. As shown in FIG. 1, the power rack 2 is disposed in the cooling slot 3, the power rack 2 and the power factor correction circuit 1 disposed in the power rack 2 utilize the cooling liquid 31 of the cooling slot 3 to dissipate the heat. In the below description, the air is served as a first dielectric medium, and the cooling slot 3 is served as a second dielectric medium. The second dielectric constant of the second dielectric medium is greater than the first dielectric constant of the first dielectric medium.

In the above embodiment, when the power factor correction circuit 1 is disposed in the first dielectric medium, the switching element assembly 12 is controlled to operate in the first operating frequency during the duty cycle, and the inductor element 11 of the power factor correction circuit 1 has a first suppression frequency in the first dielectric medium. When the power factor correction circuit 1 is disposed in the second dielectric medium, the switching element assembly 12 is controlled to operate in the second operating frequency during the duty cycle, and the inductor element 11 of the power factor correction circuit 1 has a second suppression frequency in the second dielectric medium. The second operating frequency is less than the first operating frequency. The second suppression frequency is less than the first suppression frequency. In this embodiment, the first suppression frequency, the second suppression frequency and a harmonic frequency are adjusted in real-time according to the operating frequency of the switch element assembly 12 by the controller 4. Preferably but not exclusively, the controller 4 is an embedded software.

For maintaining the stability of the product, the power factor correction circuit 1 must comply with the limitation frequency range specified in the electromagnetic interference standards in various dielectric mediums. The limitation frequency range refers to the range of frequencies measurable by the electromagnetic interference measurement machine. The limitation frequency range is ranged between a minimum limitation frequency and a maximum limitation frequency. For example, the limitation frequency range is ranged between 150 kHz and 30 MHz. Namely, the minimum limitation frequency is 150 kHz, and the maximum limitation frequency is 30 MHz.

For reducing the value of the noise measured by the electromagnetic interference measurement machine, the operating frequency of the power factor correction circuit 1 is reduced. When the power factor correction circuit 1 operates at three times of the operating frequency, the noise of the electromagnetic interference cannot be measured by the machine. The control method will be described below. As shown in FIG. 3, firstly, a step S1 is performed. In the step S1, a first dielectric medium and a second dielectric medium are provided. The second dielectric constant of the second dielectric medium is greater than the first dielectric constant of the first dielectric medium. Then, a step S2 is performed. In the step S2, the power factor correction circuit 1 is confirmed to dispose in the first dielectric medium, the switching element assembly 12 is controlled to operate in the first operating frequency by the controller 4, and the inductor element 11 of the power factor correction circuit 1 has a first suppression frequency in the first dielectric medium. Then, a step S3 is performed. In the step S3, the first operating frequency of the power factor correction circuit 1 is controlled to less than one-third of the minimum limitation frequency, and the first operating frequency is controlled to less than 1−Nth of the first suppression frequency. N is an integer multiple relating the harmonic frequency to the first operating frequency of the power factor correction circuit 1. Then, a step S4 is performed. In the step S4, the power factor correction circuit 1 is confirmed to dispose in the second dielectric medium, switching element assembly 12 is controlled to operate in the second operating frequency by the controller 4, and the inductor element 11 of the power factor correction circuit 1 has a second suppression frequency in the second dielectric medium. Then, a step S5 is performed. In the step S5, the second operating frequency of the power factor correction circuit 1 is controlled to less than 1−Nth of the second suppression frequency. N is the integer multiple relating the harmonic frequency to the second operating frequency of the power factor correction circuit 1. As shown in FIG. 2B, the operating frequency of the power factor correction circuit 1 is less than 50 kHz (i.e., 150 KHz/3). For example, the operating frequency of the power factor correction circuit 1 is 48 KHz. The noise of the electromagnetic interference of the power factor correction circuit 1 operated in three-times of the operating frequency is not in the measuring range. Namely, the noise of the electromagnetic interference of the power factor correction circuit 1 operated in three-times of the operating frequency is not ranged between 150 kHz and 30 MHz. Consequently, the machine cannot measure the noise of the electromagnetic interference of the power factor correction circuit 1 operated in three-times of the original operating frequency, and the noise of the electromagnetic interference of the power factor correction circuit 1 which is measured is reduced. For example, the noise of the electromagnetic interference of the power factor correction circuit 1 which is measured is −17.05 dB. In the above control method, the value of the operating frequency can be adjusted by controlling the operation of the switches disposed within the power factor correction circuit 1.

For avoiding the waveform peaks of the electromagnetic interference to concentrate at the single test frequency, the duty cycle of the power factor correction circuit 1 of the present disclosure is divided to a plurality of sub duty cycles. Each sub duty cycle operates with the corresponding operating frequency for dispersing the waveform peaks of the electromagnetic interference. In an embodiment, the duty cycle of the power factor correction circuit 1 disposed in the second dielectric medium includes at least three continuous sub duty cycles. The second operating frequency of the power factor correction circuit 1 is divided to at least three different sub operating frequencies. Each sub duty cycle of the power factor correction circuit 1 includes a corresponding sub operating frequency. Namely, the power factor correction circuit 1 operates in at least three different sub operating frequencies during the duty cycle for reducing the waveform peaks of the electromagnetic interference.

For example, the duty cycle of the power factor correction circuit 1 is divided to three sub duty cycles. The three sub duty cycles include a first sub duty cycle, a second sub duty cycle and a third sub duty cycle. The power factor correction circuit 1 operates cyclically according to the first duty cycle, second duty cycle and third duty cycle. The operating frequency of the power factor correction circuit 1 operated in the first duty cycle is corresponding to a lower frequency (i.e., (80−X) kHz). Namely, the power factor correction circuit 1 in the first sub duty cycle operates with the lower frequency. The operating frequency of the power factor correction circuit 1 operated in the second duty cycle is corresponding to a center frequency (i.e., 80 kHz). Namely, the power factor correction circuit 1 in the second sub duty cycle operates with the center frequency. The operating frequency of the power factor correction circuit 1 operated in the third duty cycle is corresponding to an upper frequency (i.e., (80+X) kHz). Namely, the power factor correction circuit 1 in the third sub duty cycle operates with the upper frequency. Consequently, the waveform peaks of the electromagnetic interference are separated to three different operating frequencies in three different duty cycles. The energy of the noise of the electromagnetic interference is reduced, and the noise of the electromagnetic interference of each test frequency is reduced. In this embodiment, the center frequency is greater than the lower frequency, and the upper frequency is greater than the center frequency. The upper frequency is less than 1−Nth of the second suppression frequency. The value of the lower frequency is adjusted according to practical requirement. For achieving the requirement of average spreading, in some embodiments, the frequency difference between the center frequency and the lower frequency is equal to the frequency difference between the center frequency and the upper frequency.

In an embodiment, the power factor correction circuit 1 includes a dielectric medium determination unit 41. The dielectric medium determination unit 41 determines the medium dielectric constant by the electrical characteristics of the component capacitance or inductance disposed in the dielectric medium determination unit 41. For example, the dielectric medium determination unit 41 determines an equivalent capacitance through the forked electrodes and selects the first operating frequency of the first dielectric medium or the second operating frequency of the second dielectric medium according to the medium dielectric constant.

As mentioned above, according to the control method of the present disclosure, the first operating frequency of the power factor correction circuit is controlled to less than one-third of the minimum limitation frequency, the first operating frequency is controlled to less than 1−Nth of the first suppression frequency, and the second operating frequency of the power factor correction circuit is controlled to less than 1−Nth of the second suppression frequency. Consequently, at least portion of the operating frequency of the power factor correction circuit is not in the range measured by the machine so as to reduce the value of the noise of the electromagnetic interference. Moreover, the duty cycle of the power factor correction circuit of the present disclosure is divided to a plurality of sub duty cycles. The power factor correction circuit operates in corresponding operating frequency under different duty cycle for avoiding the waveform peaks of the electromagnetic interference to concentrate at a single test frequency. Consequently, the waveform peaks of the electromagnetic interference are dispersed, and the value of the noise of the electromagnetic interference measured by the machine is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a power factor correction circuit, the power factor correction circuit complying with a minimum limitation frequency specified in an electromagnetic interference standard, and the control method comprising steps of:

(a) providing a first dielectric medium and a second dielectric medium, wherein a second dielectric constant of the second dielectric medium is greater than a first dielectric constant of the first dielectric medium;

(b) confirming that when the power factor correction circuit is disposed in the first dielectric medium, a switching element assembly is controlled to operate in a first operating frequency by a controller, wherein an inductor element of the power factor correction circuit has a first suppression frequency in the first dielectric medium;

(c) controlling the first operating frequency of the power factor correction circuit to less than one-third of the minimum limitation frequency, and controlling the first operating frequency to less than 1−Nth of the first suppression frequency, wherein N is an integer multiple relating a harmonic frequency to the first operating frequency of the power factor correction circuit;

(d) confirming that when the power factor correction circuit is disposed in the second dielectric medium, the switching element assembly is controlled to operate in the second operating frequency by the controller, wherein the inductor element of the power factor correction circuit has a second suppression frequency in the second dielectric medium; and (e) controlling the second operating frequency of the power factor correction circuit to less than 1−Nth of the second suppression frequency, wherein N is the integer multiple relating the harmonic frequency to the second operating frequency of the power factor correction circuit.

2. The control method according to claim 1, wherein in the step (a), the first dielectric medium is air, and the second dielectric medium is a cooling slot.

3. The control method according to claim 1, wherein the minimum limitation frequency is 150 kHz.

4. The control method according to claim 1, wherein the step (d) further comprises steps of:

(d1) dividing a duty cycle of the power factor correction circuit disposed in the second dielectric medium to at least three sub duty cycles which are continuous, and dividing the second operating frequency of the power factor correction circuit to at least three sub operating frequencies which are different, wherein each of the at least three sub duty cycles of the power factor correction circuit includes corresponding one of the at least three sub operating frequencies.

5. The control method according to claim 4, wherein in the step (d1), the at least three sub operating frequencies comprises at least one lower frequency, a center frequency and at least one upper frequency, the power factor correction circuit operates with the at least one lower frequency at least once during the at least three sub duty cycles, the power factor correction circuit operates with the center frequency at least once during the at least three sub duty cycles, and the power factor correction circuit operates with the at least one upper frequency at least once during the at least three sub duty cycles.

6. The control method according to claim 5, wherein the center frequency is greater than the at least one lower frequency, the at least one upper frequency is greater than the center frequency, and the at least one upper frequency is less than 1–Nth of the second suppression frequency.

7. The control method according to claim 5, wherein a frequency difference between the center frequency and the at least one lower frequency is equal to a frequency difference between the center frequency and the at least one upper frequency.

8. The control method according to claim 1, wherein the control method further comprises steps of:

(f) the first suppression frequency, the second suppression frequency and the harmonic frequency are adjusted in real-time according to the first operating frequency and the second operating frequency of the switch element assembly by the controller.

9. The control method according to claim 1, wherein the control method further comprises steps of:

(g) providing a dielectric medium determination unit to determine a medium dielectric constant, and selecting the first operating frequency of the first dielectric medium or the second operating frequency of the second dielectric medium according to the medium dielectric constant.

* * * * *